US009003963B2

(12) United States Patent
Knecht et al.

(10) Patent No.: US 9,003,963 B2
(45) Date of Patent: Apr. 14, 2015

(54) BLADE ATTACHMENT FOR MEAT CUTTERS

(75) Inventors: Manfred Knecht, Bergatreute (DE); Christian Eichert, Bergatreute (DE)

(73) Assignee: Knecht Maschinenbau GmbH, Bergatreute (DE)

( * ) Notice: Subject to any disclaimer, the term of this patent is extended or adjusted under 35 U.S.C. 154(b) by 1538 days.

(21) Appl. No.: 12/084,100

(22) PCT Filed: Oct. 19, 2006

(86) PCT No.: PCT/DE2006/001860
§ 371 (c)(1), (2), (4) Date: Jul. 15, 2008

(87) PCT Pub. No.: WO2007/048390
PCT Pub. Date: May 3, 2007

(65) Prior Publication Data
US 2009/0126582 A1 May 21, 2009

(30) Foreign Application Priority Data
Oct. 28, 2005 (DE) ........................ 10 2005 052 191

(51) Int. Cl.
*A47J 25/00* (2006.01)
*B02C 18/20* (2006.01)
*B02C 18/06* (2006.01)

(52) U.S. Cl.
CPC ............... *B02C 18/20* (2013.01); *B02C 18/065* (2013.01)

(58) Field of Classification Search
USPC .................. 99/537, 509, 545, 546, 564, 596; 241/82.1–82.7, 199.2, 199.12, 292, 241/292.1, 294; 83/471, 483, 488, 489, 83/491, 492, 495, 663–666, 878
See application file for complete search history.

(56) References Cited

U.S. PATENT DOCUMENTS

| | | | | | |
|---|---|---|---|---|---|
| 217,509 | A | * | 7/1879 | Burhans | 241/294 |
| 1,015,403 | A | * | 1/1912 | Schaarsghmidt | 241/292.1 |
| 1,190,329 | A | * | 7/1916 | Schmidt | 241/294 |
| 1,203,901 | A | * | 11/1916 | Newhouse | 241/294 |
| 1,205,474 | A | * | 11/1916 | Newhouse | 241/294 |
| 1,236,260 | A | * | 8/1917 | Bullock | 241/294 |
| 1,330,461 | A | * | 2/1920 | Ganzhorn | 241/292.1 |
| 1,396,600 | A | * | 11/1921 | Simpson | 241/277 |
| 1,397,398 | A | * | 11/1921 | Brown, Jr. | 241/82.5 |
| 1,401,978 | A | * | 1/1922 | Hall | 241/277 |
| 1,512,484 | A | * | 10/1924 | Porter | 241/277 |

(Continued)

FOREIGN PATENT DOCUMENTS

| | | | | | |
|---|---|---|---|---|---|
| DE | 3424427 | A1 | * | 1/1986 | B02C 18/18 |
| DE | 37 35 651 | A1 | | 5/1989 | |

(Continued)

*Primary Examiner* — Henry Yuen
*Assistant Examiner* — Eric Stapleton
(74) *Attorney, Agent, or Firm* — Breneman & Georges

(57) ABSTRACT

A meat cutter, a blade head and an associated cutter blade (11, 12) are provided to reduce the complexity with respect to assembly and disassembly and the diversity of the parts, and the potential danger during assembly and disassembly. This is achieved according to the invention by providing the blade foot (2) of the cutter blade (1, 11, 12) with a toothing structure (8) with projections (9) and recesses (10), which point towards the drive shaft (19) and by means of which the cutter blade (11, 12) can be positioned in a rotationally secure manner in a matching toothing structure (14), by being pushed on in the axial direction.

5 Claims, 6 Drawing Sheets

(56) References Cited

U.S. PATENT DOCUMENTS

| | | | | | |
|---|---|---|---|---|---|
| 1,703,762 | A | * | 2/1929 | Brown, Jr. | 241/292.1 |
| 1,713,609 | A | * | 5/1929 | Krider | 241/294 |
| 1,744,597 | A | * | 1/1930 | Vasconcellos | 172/556 |
| 1,891,712 | A | * | 12/1932 | Jahn | 241/292.1 |
| 1,906,609 | A | * | 5/1933 | Jahn | 241/292.1 |
| 1,916,192 | A | * | 7/1933 | Anctil | 241/292.1 |
| 1,947,440 | A | * | 2/1934 | Milne | 241/294 |
| 2,148,547 | A | * | 2/1939 | Fiese et al. | 460/122 |
| 2,149,193 | A | * | 2/1939 | Stock | 241/292.1 |
| 2,206,529 | A | * | 7/1940 | Dieckmann | 241/292.1 |
| 2,796,102 | A | * | 6/1957 | Schmidt, Jr. | 241/291 |
| 3,030,993 | A | * | 4/1962 | Schmook, Jr. | 241/282.2 |
| 3,279,296 | A | * | 10/1966 | Jung et al. | 83/664 |
| 3,330,317 | A | * | 7/1967 | Schaller | 241/282.2 |
| 3,730,363 | A | * | 5/1973 | Karpf | 241/282.1 |
| 3,871,590 | A | * | 3/1975 | Steffens | 241/282.2 |
| 3,897,020 | A | * | 7/1975 | Knecht | 241/292.1 |
| 3,937,408 | A | * | 2/1976 | Buck | 241/282.2 |
| 4,145,009 | A | * | 3/1979 | Fukui | 241/194 |
| 4,211,371 | A | * | 7/1980 | Hotimsky | 241/282.1 |
| 4,250,621 | A | * | 2/1981 | Houle | 30/347 |
| 4,250,622 | A | * | 2/1981 | Houle | 30/347 |
| 4,294,415 | A | * | 10/1981 | Wetter et al. | 241/292 |
| 4,295,324 | A | * | 10/1981 | Frantello et al. | 56/12.7 |
| 4,502,219 | A | * | 3/1985 | Hibben | 30/153 |
| 4,638,697 | A | * | 1/1987 | Hager et al. | 83/356.3 |
| 4,696,434 | A | * | 9/1987 | Vomhof et al. | 241/282.2 |
| 4,702,424 | A | * | 10/1987 | Widlak | 241/101.76 |
| 4,732,337 | A | * | 3/1988 | Knecht | 241/292.1 |
| 4,754,667 | A | * | 7/1988 | Widmann et al. | 76/37 |
| 4,770,353 | A | * | 9/1988 | Steffens | 241/282.2 |
| 4,781,331 | A | * | 11/1988 | Potts | 241/236 |
| 4,930,709 | A | * | 6/1990 | Steffens | 241/282.2 |
| 4,930,710 | A | * | 6/1990 | Hench | 241/294 |
| 4,936,516 | A | * | 6/1990 | Hench | 241/294 |
| 4,966,332 | A | * | 10/1990 | Laska | 241/199.7 |
| 5,022,594 | A | * | 6/1991 | Gordon et al. | 241/282.2 |
| 5,027,684 | A | * | 7/1991 | Neukam | 83/481 |
| 5,345,848 | A | * | 9/1994 | Knecht | 83/663 |
| 5,640,836 | A | * | 6/1997 | Lingerfelt | 56/255 |
| 5,918,822 | A | * | 7/1999 | Sternby | 241/46.17 |
| 5,921,480 | A | * | 7/1999 | Wenzel | 241/29 |
| 5,941,469 | A | * | 8/1999 | Spiegemacher | 241/291 |
| 5,957,176 | A | * | 9/1999 | Stein | 144/230 |
| 6,129,300 | A | * | 10/2000 | Heukamp et al. | 241/191 |
| 6,142,197 | A | * | 11/2000 | Kokko | 144/176 |
| 6,164,196 | A | * | 12/2000 | Deschamps et al. | 99/513 |
| 6,343,755 | B1 | * | 2/2002 | Barclay et al. | 241/236 |
| 6,364,227 | B1 | * | 4/2002 | Dorscht | 241/197 |
| 6,375,106 | B1 | * | 4/2002 | Sears | 241/294 |
| 6,382,539 | B1 | * | 5/2002 | Gulke | 241/292.1 |
| 6,386,469 | B1 | * | 5/2002 | Meister et al. | 241/294 |
| 6,439,486 | B1 | * | 8/2002 | Nitta et al. | 241/29 |
| 6,446,547 | B2 | * | 9/2002 | Kubicko et al. | 99/467 |
| 6,481,655 | B1 | * | 11/2002 | Feigel, Jr. | 241/294 |
| 6,532,863 | B1 | * | 3/2003 | Lee | 99/348 |
| 6,595,121 | B1 | * | 7/2003 | Chang Chien | 99/510 |
| 6,709,150 | B2 | * | 3/2004 | Lin | 366/199 |
| 6,814,323 | B2 | * | 11/2004 | Starr et al. | 241/282.2 |
| 7,048,218 | B2 | * | 5/2006 | Hunag | 241/295 |
| 7,614,574 | B2 | * | 11/2009 | Jakobi et al. | 241/292.1 |
| 7,621,476 | B2 | * | 11/2009 | Jakobi et al. | 241/101.3 |
| 8,113,453 | B2 | * | 2/2012 | Bardos | 241/189.1 |
| 8,132,752 | B1 | * | 3/2012 | Hotaling et al. | 241/282.1 |
| 8,197,121 | B2 | * | 6/2012 | Sands | 366/246 |
| 2004/0203329 | A1 | * | 10/2004 | Lin | 451/357 |
| 2005/0127220 | A1 | * | 6/2005 | Rankin | 241/294 |
| 2005/0167537 | A1 | * | 8/2005 | Chen | 241/292.1 |

FOREIGN PATENT DOCUMENTS

| | | | | | |
|---|---|---|---|---|---|
| DE | 10 2004 023 644 | A1 | | 12/2005 | |
| EP | 0 308 666 | A1 | | 3/1989 | |
| EP | 503198 | A1 | * | 9/1992 | B02C 18/18 |
| GB | 594 588 | A | | 11/1947 | |

* cited by examiner

BLADE ATTACHMENT FOR MEAT CUTTERS

BACKGROUND OF THE INVENTION (1) Field of the Invention

The invention relates to a meat cutter, a blade head and a cutter blade for meat cutters having at least one rotatable blade with at least one blade arranged in one plane rotatably secured to a drive shaft. More particularly a cutter blade foot is provided having a tooth structure pointing toward a drive shaft with projections and recesses for positioning a cutter blade in a rotationally secure manner on a drive shaft having a matching tooth structure.

(2) Description of Related Art Including Information Disclosed Under 37 CFR 1.97 and 1.98

Meat cutters are used in meat processing for the mincing and blending of meat products, in particular in sausage production. Such meat cutters generally have an annular bowl, in which a rotary blade head having a plurality of cutter blades is disposed. The annular bowl here rotates about an axis standing perpendicular to the rotational axis of the blade head, so that the material to be processed is fed to within the working range of the blade head by the rotation of the annular bowl.

For such meat cutters, prior art blade heads have already been disclosed (cf. DE 37 35 651 A1), in which, respectively, two cutter blades are arranged in one plane. Cutter blades of this type are usually fastened with bolts or the like to driving disks, which with an internal hexagonal profile are fitted in a rotationally secure manner on a drive shaft of the meat cutter with external hexagonal profile.

In addition, meat cutters with blade heads are known on the market, in which the blades are fastened on a round shaft with the aid of keyways and feather keys. A star-shaped shaft profile having two mutually offset hexagonal profiles is also used in commercially available blade heads.

The arrangement of two blades in one plane brings advantages with regard to the concentricity. Since blade heads in meat cutters rotate at very high speeds, it is fundamentally advantageous to prevent imbalances, for which purpose two mutually opposing blades in one plane are normally used.

In traditional cutter blades of the above-stated type, the shape of the blade feet and the fixing thereof is problematical since, as a result of the load imposed by the blades in the acceleration or processing of the material present in the meat cutter, enormous forces and ensuing stresses can arise. These problems and measures for solving these problems are described, for example, in printed publication DE 10 2004 023 644.

In all known cutter blades, the nature of the fastening, for example by means of blade bolts, to axially adjacent driving disks with respect to the complexity involved in the assembly and disassembly and the diversity of the parts. Moreover, the use of such blade bolts or the like gives rise to a potential danger in the assembly and disassembly of the cutter blades.

BRIEF SUMMARY OF THE INVENTION

In contrast to the prior art a meat cutter, a blade head and associated cutter blades are provided which eliminate or reduce the number of parts as well as the dangers and complexity involved in assembling and disassembling of a cutter blade to a meat cutter shaft.

Starting from a meat cutter of the type described in the description of the related art, the advantages of the invention are achieved by having a cutter blade with a cutter foot having a tooth structure pointing toward a meat cutter drive shaft with projections and recesses for positioning the cutter blade in a rotationally secure manner on a meat cutter drive shaft having a corresponding tooth structure.

Additional advantageous embodiments and refinements of the invention are possible by having at least two cutter blades arranged in one plane, by having the cutter blade foot fixed in the radial direction by a tooth structure for each cutter blade, by having two cutter blades arranged in one plane as a double cutter blade, by having at least two separate mutually opposed cutter blades, by having a mounting element provided between the blade feet of the cutter blades of at least one blade plane and a drive shaft in which the mounting element has a tooth structure matching the tooth structure of the cutter blades, by having the mounting element disposed in the radial direction between the blade feet and the drive shaft, by having the mounting element formed as a mounting sleeve which extends in the axial direction over a plurality of blade planes, by having the mounting element configured as a mounting disk for one blade plane, by having the mounting element with an internal hexagonal profile and/or a keyway for a feather key, by having a circumferential angle of 360 degrees as an integral multiple of the spacing element for the individual teeth and/or spaces of the tooth structure, by having the spacing of the tooth structure at about 15 degrees, by having two or more regions with a tooth structure which are spaced apart along the circumference, by having the individual teeth of the tooth structure configured to at least partially undercut in the radial direction, by having individual teeth of the tooth structure configured to not undercut in the radial direction, by having one or more spacer washers provided in the axial direction for an axial offset of different blade planes, by having an initial thrust ring and/or interlocking ring provided for the axial fastening of the blade head on the drive shaft, by having a blade head for a meat cutter having one or more of the foregoing features and/or having a cutter blade for a meat cutter having one or more of the foregoing features.

Accordingly, a meat cutter, or its blade head and an associated cutter blade, is characterized in that the blade foot of the cutter blade has a toothing structure pointing towards the drive shaft and having projections and recesses by means of which the cutter blade can be positioned in a rotationally secure manner in a matching toothing structure on sides of the drive shaft, by being pushed on in the axial direction.

As a result of such a measure, the assembly and disassembly of the cutter blade is made considerably easier. No clamping elements whatever, such as blade bolts or clamping screws, have to be removed. A relevant operator can grip with both hands the blades to be assembled or disassembled and bring them into a secure, fitted setting or remove them from a secure, fitted setting. This yields considerable advantages with regard to the work safety.

In addition, in a corresponding concrete configuration, the complexity involved in the production can be reduced, since the configuration of mounting elements for clamping bolts, clamping screws or the like, as well as the associated design measures, can be replaced by simpler designs.

In this context, it is worthy of note that the toothing structure can be disposed on the circumference of the drive shaft in such a way that, after the mating toothings have been fixed by being pushed on in the axial direction, the blade is secured not only in a rotationally secure manner, but also against removal in the radial direction.

Preferably, in a blade head according to the invention, at least two cutter blades arranged in one plane are provided. Such an arrangement dictates a concentric running without major imbalances and hence reduces the load upon the drive shaft.

In one particular embodiment of the invention, two cutter blades arranged in one plane are configured as a double blade. A double blade, in which the blade feet are integrally connected to one another in the center, is harder and more difficult to handle than a single blade due to the greater mass and the sharp cutting edges which are present on both sides. However, the inventive fixing of such blades in turn facilitates handling and improves work safety, so that a double blade in this embodiment is easier and safer to use than in traditional meat cutters.

In a preferred embodiment, however, two separate cutter blades, which lie opposite each other in one plane, are provided. The simpler and safe handling of an individual blade is thereby achieved, whilst, at the same time, the above-stated advantages according to the invention are additionally obtained.

The inventive toothing structure on sides of the drive shaft, matching the toothing structure of the cutter blade, can be placed, for example, directly in the drive shaft.

A preferred embodiment, on the other hand, provides a mounting element which is provided between the blade foot or feet and the drive shaft and which has the toothing structure matching the toothing structure of the blades. With the aid of such a mounting element, which is accordingly disposed in the radial direction between blade foot and drive shaft, an inventive blade fastening can also be used in traditional meat cutters, in which the drive shaft has a hexagonal profile, or in other meat cutters. In particular, the retrofitting of meat cutters which are already in service is also possible in a problem-free manner with the aid of such a mounting element.

Such a mounting element can here be configured, for example, as a sleeve which extends in the axial direction Over a plurality of blade planes. Such a sleeve offers the advantage that only a single mounting element has to be put onto the drive shaft prior to the fitting of the blades, and thus the toothing structure for fixing a plurality of blades in different planes is provided in one work operation.

In another embodiment, the mounting element is configured as a mounting disk for just one blade plane. This embodiment offers an advantage in the construction of the blade head. Thus, for instance, two blades arranged in one plane can be fastened to a mounting disk, for example by means of clips, bolts and/or screws. This fastening here serves as an assembly aid, i.e. the entire unit, comprising two blades and the mounting disk, can then easily be mounted on the drive shaft. The rotationally secure connection between the mounting disk and the drive shaft can here be realized conventionally, for example via an internal hexagonal profile or a round shaft with keyways and feather key.

Preferably, the mounting profile is provided with an internal hexagonal profile and/or a keyway for the rotationally secure connection by means of a feather key, so that the inventive toothing structure, as already indicated above, is usable in commercially available and, in particular, also in pre-existing meat cutters.

In one specific embodiment of the invention, at least the toothing structure on sides of the drive shaft is provided with an even circumferential distribution. This is advantageous, in particular, if a mounting sleeve is used for the configuration of the drive-side toothing structure, since, given an even distribution over the circumference, the desired angular offset between the individual blade planes can be achieved without additional measures by the blades being pushed on in the desired angular position.

The toothing structure is advantageously constructed such that an even spacing over the outer circumference or an angular range of 360 degrees is obtained. This dictates that the spacing angle assumed by the individual teeth and/or individual spaces of the toothing structure fits integrally into the total circumferential angle of 360 degrees, or the total circumferential angle of 360 degrees is an integral multiple of the spacing angle. In such a design, an even angular offset of one or more spacing angles of the cutter blades in the construction of the blade head is possible.

It has proved advantageous, for the spacing of the toothing structure, to provide a spacing angle of about 15 degrees. With such a spacing, different angular positions in 15-degree steps are possible, for example an angular offset of 30 degrees, 45 degrees or 60 degrees between individual blade planes. In addition, such a tooth spacing offers a sufficient number of interlocking structural elements to ensure the working of the inventive mounting.

The blade feet can here also have an even circumferential distribution of the toothing structure over the angular range which they cover. This does not necessarily have to be the case, however. An inventive fastening can also readily be obtained when the blade feet have two or more regions with toothing structure, which are spaced apart along the circumference. In between, circumferential portions can be provided in the blade feet, which make no contribution to the fixing and have, for example, a smooth circular path. A toothing which is not distributed all the way round can in certain applications bring about an easier assembly or disassembly in the axial direction, since fewer toothing elements need in this case to be mutually displaced.

In order, when the toothing structures are meshed together in the axial direction, to effect not only a torsionally secure fastening, but also, at the same time, a fixing in the radial direction, toothing structures having a correspondingly large angular spacing and/or a corresponding design of the individual toothings must in any event be chosen, so that, after the blade has been mounted in the axial direction, a radial fixing is also ensured, which, in particular, is also capable of absorbing centrifugal forces generated in the rotation of the blade head.

A radial fixing of this kind can be obtained, for example, by the individual toothings of the toothing structure being configured such that they are at least partially undercutting in the radial direction. In one toothing structure having individual undercutting toothings, a radial fixing is effected by each individual toothing. This embodiment consequently offers an increased stability compared to radially acting centrifugal forces.

A radial fixing is also possible, however, with non-undercutting individual toothings. Care should here be taken to ensure, however, that an angular range for the arrangement of the toothing structures is chosen, in which the radial fixing is effected by the interaction between mutually spaced toothings. In the case of radially running toothings having parallel side flanks, configured in non-undercutting design as an individual toothing, this is achieved, for example, already by two individual toothings, as soon as at least two tooth flanks display a path converging in the direction of the drive shaft.

In order to increase the radial holding forces, it is here sensible, however, to provide a toothing structure in the marginal regions of the blade foot, i.e. where the toothing structures lie opposite one another at a very large angle approaching 180 degrees.

Advantageously, one or more spacer washers is/are additionally provided in the axial direction for an axial offset of different blade planes. With regard to the axial arrangement of the blades, a proven construction with desired axial offset can thereby be obtained. These spacer washers in this case can have a circular recess on the inside, since they do not need to interact with the toothing structure, for example of a mounting sleeve.

In one refinement of the invention, an initial thrust ring and/or a locking ring is/are additionally provided for the axial fastening of the blade head on the drive shaft. These rings, which can be fixed, for example clamped or screwed, in the usual manner on the drive shaft, ensure, on the one hand, the axial positioning of the blade head and, in addition, the cohesion of the different planes of the assembled blade head in the axial direction.

Preferably, the spacer washers, the initial thrust ring and/or the locking ring are provided with weight-reducing structures, for example with material cutouts, to reduce the total weight of the blade head.

In a toothing according to the invention, it is also possible to provide blade planes having only one cutter blade. This is advantageous, for example in the draw-in region of the material to be processed, in order to improve the drawing of the material into the blade head and prevent a material jam. This individual blade can here readily be made structurally identical with the other cutter blades. On the other hand, it is also possible, however, to equip an individual blade of this kind with a blade foot which makes full use of the toothing on sides of the drive shaft, i.e. fully encloses the drive shaft.

BRIEF DESCRIPTION OF THE SEVERAL VIEWS OF THE DRAWING(S)

Two illustrative embodiments of the invention are represented in the drawing and are explained in greater detail below with reference to the figures, wherein, specifically, FIG. 1 shows a perspective representation of a cutter blade according to the invention;

DETAILED DESCRIPTION OF THE INVENTION INCLUDING BEST MODE

Figure 1:
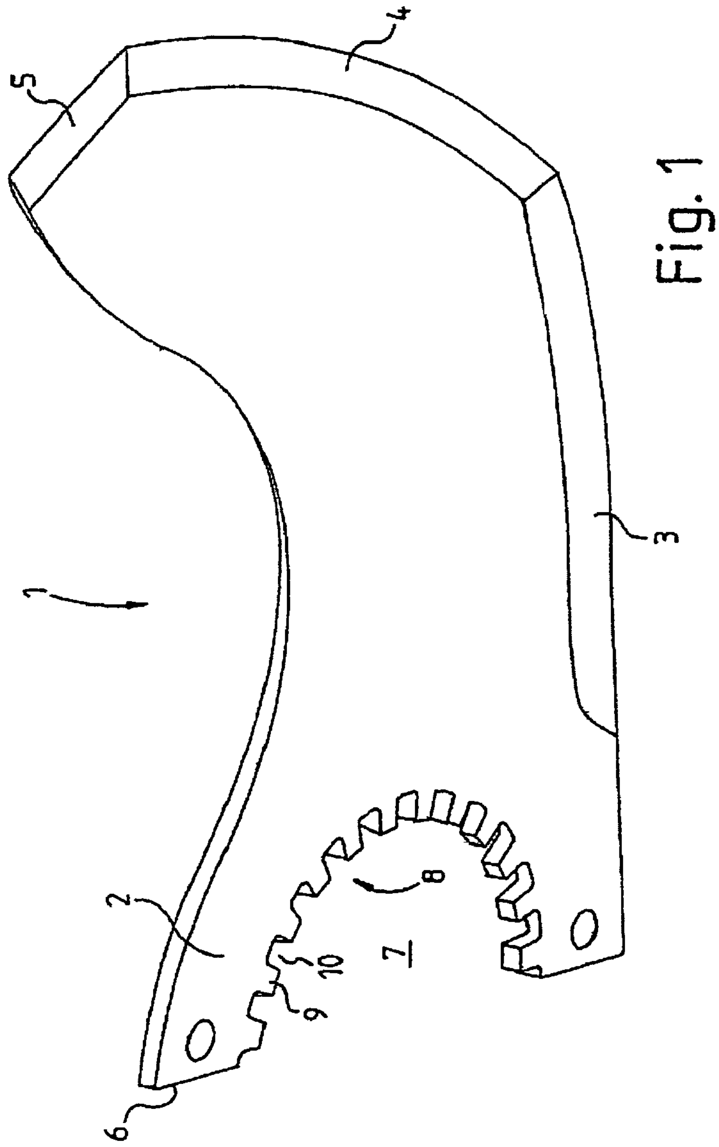

FIG. 1 shows a cutter blade 1 having a blade foot 2 and three cutting edges 3, 4, 5 arranged at an angle to one another. The blade foot 2 displays a rectilinear edge 6 and a semicircular recess 7. On the peripheral side in the recess 7 there is a toothing structure 8, comprising projections or teeth 9 and recesses or spaces 10.

With the toothing structure 8, a cutter blade 1 can be fastened on a drive shaft.

Figure 2:
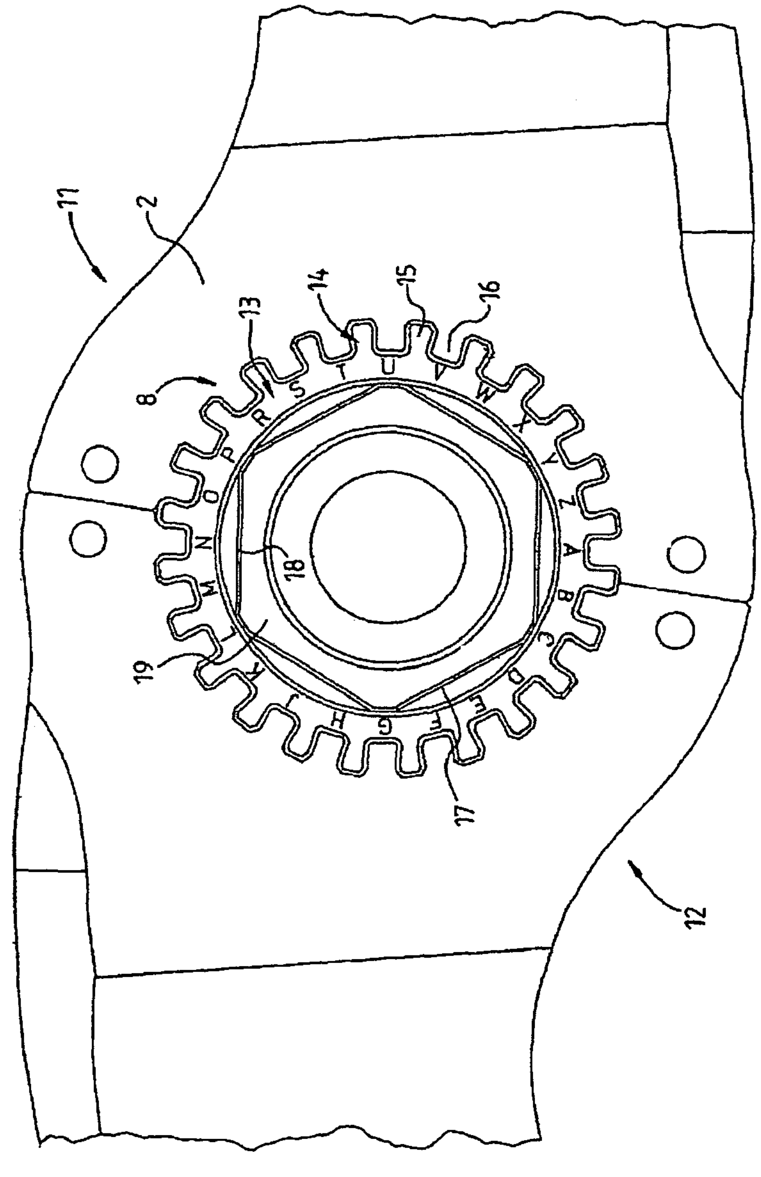
FIG. 2 shows a top view of a blade plane of a blade head according to the invention for a meat cutter.

FIG. 2 shows in top view the arrangement of a blade plane on a drive shaft of a meat cutter. Two cutter blades 11, 12, which can be configured, for example, in accordance with the cutter blade 1, respectively have a blade foot 2 as has been described with reference to FIG. 1.

These blade feet 2 are connected with their toothing structure 8 to a mounting element 13, the mounting element 13 being able to be configured in the form of a sleeve or disk. The mounting element 13 has, for its part, a toothing structure 14 with teeth 15 and spaces 16, which matches the toothing structure 8.

On the inner side, the mounting element 13 is provided with a hexagonal profile 17, which is configured to match a corresponding external hexagonal profile 18 of a drive shaft 19.

As a result of the hexagonal profiles 17, 18, the mounting element 13 is fitted in a rotationally secure manner on the drive shaft 19. The mounting element 13 is pushed onto the drive shaft 19 in the axial direction, i.e. perpendicular to the plane of representation. Next, the two cutter blades 11, 12 can be brought with their blade feet 2, likewise in the axial direction, i.e. perpendicular to the plane of representation, into the represented installation position, whereupon the teeth 9 of the toothing structure 8 of the blade feet 2 engage in the spaces 16 of the toothing structure 14 of the mounting element 13, and vice versa, i.e. the teeth 15 of the mounting element 13 engage in the spaces 10 of the blade feet 2.

Figure 3:
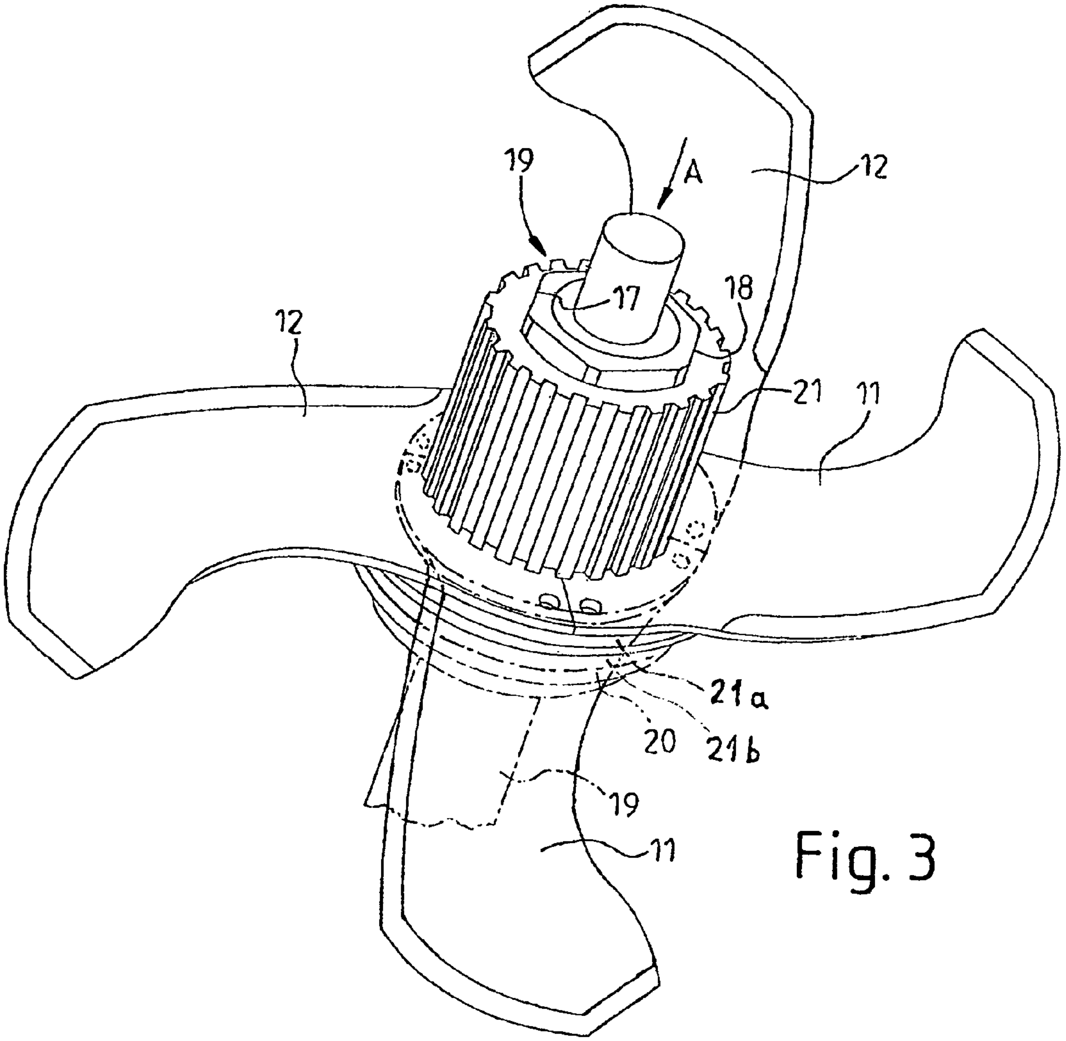
FIG. 3 shows a perspective representation of a blade head constructed, in part, with a first blade plane and a second blade plane in the axial direction for an axial offset for the different blade planes.

FIG. 3 shows a perspective representation of a partially constructed blade head.

The drive shaft 19, which in the region of the blade head has the external hexagonal profile 18, is provided with an initial thrust ring 20, which serves as an axial stop for the construction of the blade head. In the embodiment according to FIG. 3, the mounting element is a mounting sleeve 21 which has an axial length extending over a plurality of blade planes. This mounting sleeve 21 has an internal hexagonal profile 17, so that it can be placed as previously described in a rotationally secure manner onto the external hexagonal profile 18 of the drive shaft 19.

On the outer circumference, the mounting sleeve 21 displays a toothing structure 14 in accordance with the embodiment according to FIG. 2. The cutter blades 11, 12 are represented already in the fitted position, after having been pushed onto the mounting sleeve 21 in the axial direction A.

As becomes clear from this representation, further blade planes can be created by further cutter blades and, where necessary, spacer washers 21*a*, 21*b*, etc. being pushed simply onto the mounting sleeve 21. In the represented toothing structures 8, 14, an angular offset of the different blade planes can be realized without further measures, in a problem-free manner, within the scope of the tooth spacing possibilities.

Figure 4:
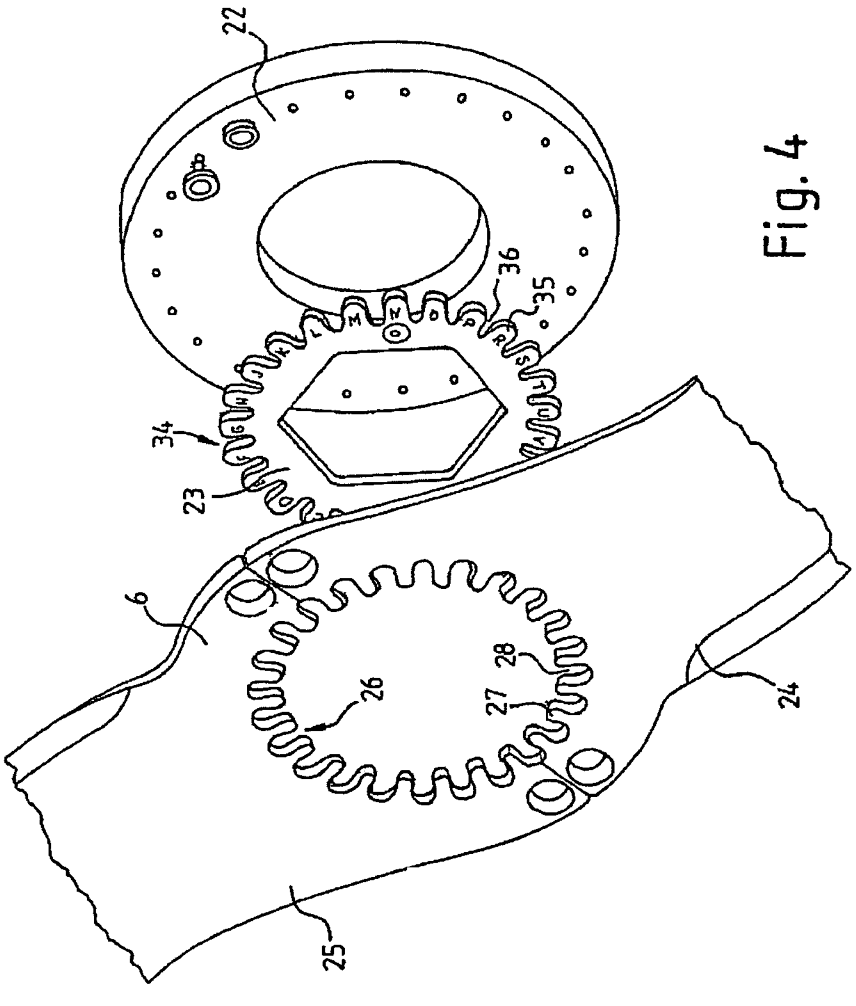
FIG. 4 shows an exploded representation of three fastening elements according to the invention for cutter blades in a blade head.

FIG. 4 shows three structural elements of a further embodiment, i.e. an initial thrust ring 22, a mounting disk 23 and also cutter blades 24, 25, the blade feet 26 are configured to include a toothing structure 26, consisting of teeth 27 and spaces 28, similar to the previously described toothing structure. The construction involving the structural elements according to the embodiment in FIG. 4 corresponds to the embodiment according to FIG. 3, a mounting disk 23 now being provided for each blade plane.

Figure 5:
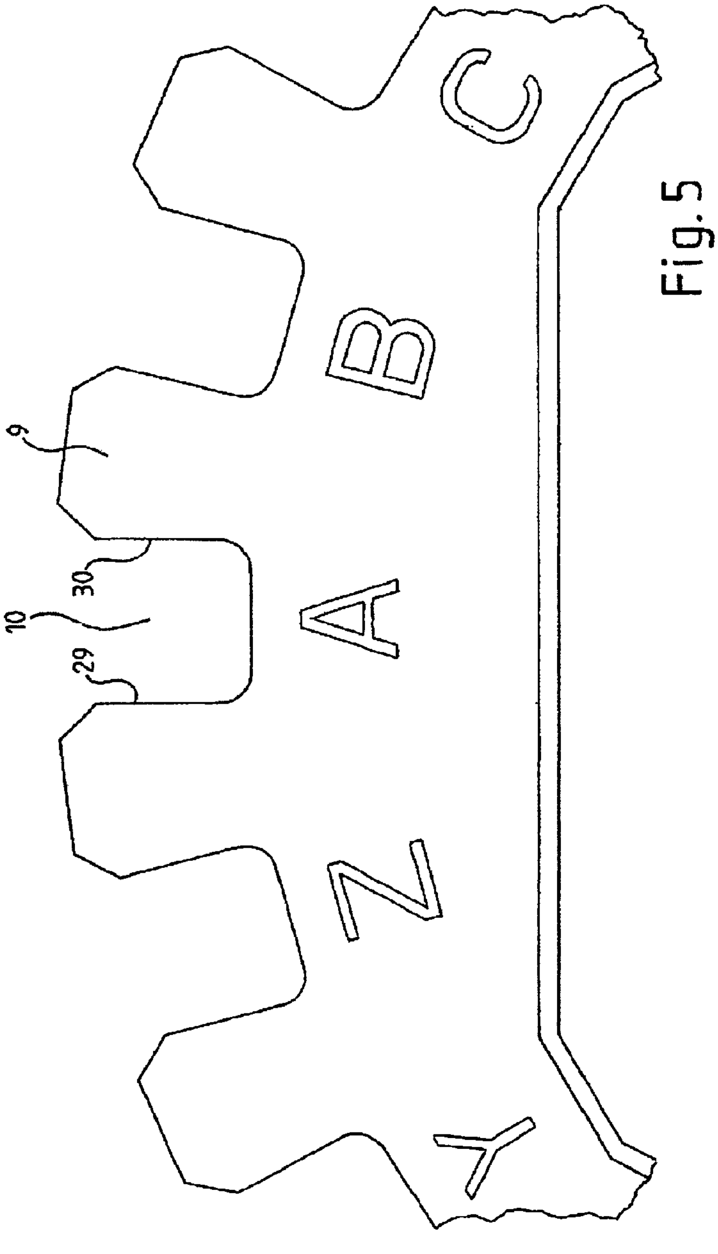
FIG. 5 shows a detailed representation of a mounting element with toothing structure in face view.

FIG. 5 shows a detail of the mounting sleeve 21 in top view, wherein in particular the teeth 9 and spaces 10 can be more easily recognized in terms of their profiling. In particular, the parallel design of the side flanks 29, 30 of the teeth 9 or spaces 10 is discernable in this embodiment. This means that the toothing structure 9, configured without undercutting of the individual teeth, is directed radially outwards.

Figure 6:
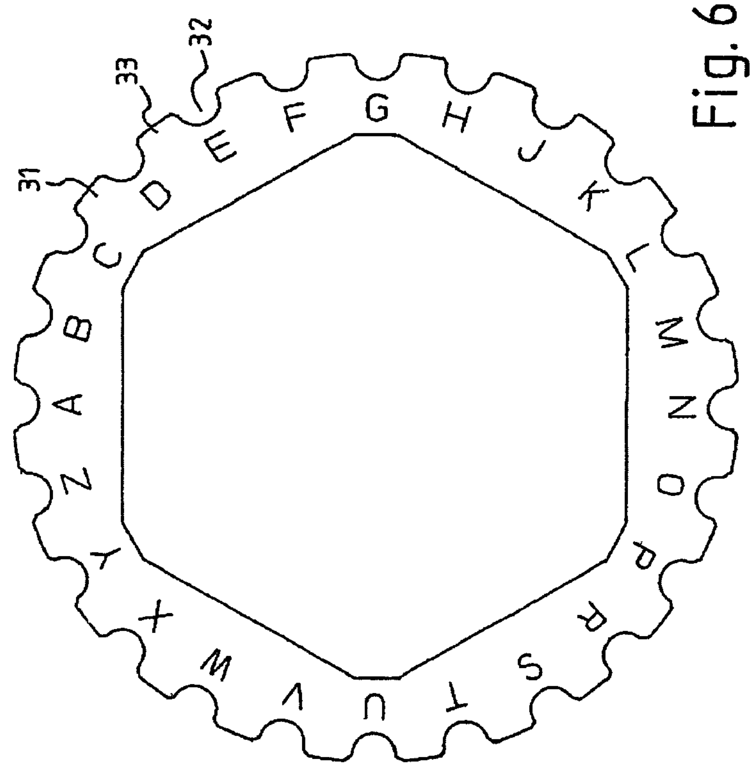
FIG. 6 shows an alternative embodiment of a mounting element with toothing structure in face view.

FIG. 6 shows a top view of a further mounting element 31, which can be configured both in accordance with the mounting disk 23 in the form of a disk for one blade plane, or in accordance with the mounting sleeve 21 in the form of a sleeve for a plurality of blade planes. In this embodiment, the spaces 32 are of semi-circular configuration, so that the side flanks of the teeth 33 have the shape of segments of a circle.

This type of toothing, too, is radially aligned and is not undercutting with respect to the individual teeth.

In contrast thereto, the shaping of the toothing structure 34 according to FIG. 4 is such that the teeth 35 have a radius which leads to an undercutting shape of the individual teeth.

All represented toothing structures 8, 14, 26, 34 are suitable for the inventive construction of a blade head.

These toothing structures here allow not only a torsionally secure fastening of the cutter blades 11, 12, 24, 25, but they also ensure a radial hold. This is readily discernable, for example, in FIG. 2. Even in non-undercutting individual toothings of mutually spaced teeth, for example the teeth Y and R or other mutually spaced pairs, these interact in such a way that the cutter blade 11 cannot be removed radially from the mounting element 13. Even with a short distance between the individual teeth, this radial fixing is established, owing to the radial tooth orientation, as soon as at least two side flanks of the teeth of the blade feet 2 converge in the direction of the drive shaft.

The radial hold can here be enhanced by an undercutting shaping of the individual teeth and spaces, for example in accordance with the teeth 35 and spaces 36 (FIG. 4).

In the represented illustrative embodiments, the toothing structures are distributed evenly over the circumference of the drive shaft 19. This offers the advantage that each optional angular setting within the grid dimension of the toothings can be achieved without additional measures, each angular offset in the dividing grid of the toothing of the mounting element 13 being adjustable, for example at a grid angle of 15 degrees.

In principle, a construction would also be conceivable, however, in which the toothings are distributed not all the way round, but only at the sites actually required. The toothing structure of the mounting element 13, just like the toothing of the blade feet 2, can here be configured differently from plane to plane with respect to the angular setting. In order to simplify production and maintain a greater freedom in the adjustment of the offset angle in a toothing without all-round even distribution, it is sensible, however, to leave the mounting element 13 toothed all the way round and, if need be, to configure the toothing structure 9 of the blade feet 2 such that it is non-continuous.

It is in any event essential that a toothing structure is provided on the blade feet and on sides of the drive shaft 19, which allows cutter blades 11, 12 to be fastened with their blade feet 2 in a rotationally secure manner to the drive shaft 19 by means of the matching toothing structures 8, 14, by being pushed on in the axial direction.

REFERENCE SYMBOL LIST

1 cutter blade
2 blade foot
3 cutting edge
4 cutting edge
5 cutting edge
6 edge
7 recess
8 toothing structure
9 tooth
10 spaces
11 cutter blade
12 cutter blade
13 mounting element
14 toothing structure
15 tooth
16 space
17 internal hexagonal profile
18 external hexagonal profile
19 drive shaft
20 initial thrust ring
21 mounting sleeve
22 initial thrust ring
23 mounting disk
24 cutter blade
25 cutter blade
26 toothing structure
27 tooth
28 space
29 side flank
30 side flank
31 mounting element
32 space
33 tooth
34 toothing structure
35 tooth
36 space

What is claimed is:

1. A blade attachment system comprising:

a meat cutter drive shaft having an external hexagonal profile and defining an axis;

a blade head for a meat cutter comprising at least two cutter blades, the cutter blades arranged in a single plane perpendicular to the axis, each cutter blade having a blade foot and one or more cutting edges, each blade foot having a rectilinear edge and a semicircular recess, a peripheral side in the recess having a semicircular toothing structure, the toothing structure comprising a plurality of projections or teeth arranged around the semicircular recess having a plurality of recesses or spaces;

a mounting element in the form of a sleeve or disk disposed between the blade feet and the drive shaft in a radial direction, the mounting element having an outer mounting toothing structure with mounting teeth and mounting spaces which match the toothing structure of each blade foot, wherein each blade foot is connected with its respective toothing structure to the mounting element by the mounting toothing structure, the mounting element having an inner hexagonal profile which is configured to match the external hexagonal profile of the drive shaft such that the mounting element is fitted in a rotationally secure manner on the drive shaft; and an initial thrust ring, which serves as an axial stop for the blade head.

2. The blade attachment system of claim 1, wherein the mounting element is a sleeve.

3. The blade attachment system of claim 1, wherein the mounting element is a disk.

4. The blade attachment system of claim 1, wherein the mounting teeth have parallel side flanks.

5. The blade attachment system of claim 1, wherein the mounting teeth have side flanks with the shape of segments of a circle.

* * * * *